United States Patent
Hazama et al.

(10) Patent No.: US 10,682,993 B2
(45) Date of Patent: Jun. 16, 2020

(54) PEDAL REARWARD DISPLACEMENT PREVENTING STRUCTURE FOR VEHICLE

(71) Applicant: MAZDA MOTOR CORPORATION, Hiroshima (JP)

(72) Inventors: Masaya Hazama, Izumisano (JP); Toshiki Okauji, Hikone (JP); Norio Kasajima, Suita (JP); Takeshi Kitagawa, Higashiomi (JP); Yoshiyasu Kajimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 108 days.

(21) Appl. No.: 16/031,153

(22) Filed: Jul. 10, 2018

(65) Prior Publication Data
US 2019/0016313 A1    Jan. 17, 2019

(30) Foreign Application Priority Data
Jul. 12, 2017    (JP) .................................. 2017-136556

(51) Int. Cl.
*B60T 7/06*    (2006.01)
*G05G 1/32*    (2008.04)
*B60R 21/09*    (2006.01)

(52) U.S. Cl.
CPC .............. *B60T 7/065* (2013.01); *B60R 21/09* (2013.01); *G05G 1/32* (2013.01)

(58) Field of Classification Search
CPC ............ B60T 7/065; B60R 21/09; G05G 1/32
See application file for complete search history.

(56) References Cited

U.S. PATENT DOCUMENTS

| | | | | |
|---|---|---|---|---|
| 6,070,489 A | * | 6/2000 | Ananthasivan | B60T 7/065 74/512 |
| 6,089,119 A | * | 7/2000 | Leboisne | B60T 7/065 180/274 |
| 6,276,483 B1 | * | 8/2001 | Sinnhuber | B60R 21/00 180/271 |
| 6,327,930 B1 | * | 12/2001 | Ono | B60R 21/09 188/377 |
| 6,701,800 B2 | * | 3/2004 | Saitou | B60R 21/09 180/274 |
| 6,808,040 B2 | * | 10/2004 | Hayashihara | B60K 26/00 180/274 |
| 7,690,279 B2 | * | 4/2010 | Himetani | B60R 21/09 180/281 |

(Continued)

FOREIGN PATENT DOCUMENTS

JP    2009-237844 A    10/2009

*Primary Examiner* — James A English
(74) *Attorney, Agent, or Firm* — Studebaker & Brackett PC

(57) ABSTRACT

Provide is a vehicle pedal rearward displacement preventing structure exhibiting better collision performance. The pedal rearward displacement preventing structure 10 for a vehicle comprises: a cross car beam 1 having a given axial direction and extending along the axial direction; a pedal rearward displacement preventing member 7 attached to the cross car beam 1 to prevent a rearward displacement of a brake pedal; and a center stay 3 for supporting the cross car beam 1. The pedal rearward displacement preventing member 7 is disposed on a forward side of the center stay 3 in a forward-rearward direction of the vehicle.

19 Claims, 5 Drawing Sheets

(56) References Cited

U.S. PATENT DOCUMENTS

| | | | | |
|---|---|---|---|---|
| 8,899,130 B2 * | 12/2014 | Bushong | ................. | B60R 21/09 180/274 |
| 8,950,778 B2 * | 2/2015 | Fukushima | .......... | B62D 25/145 280/779 |
| 2004/0003674 A1 * | 1/2004 | Endo | ....................... | B60R 21/09 74/512 |
| 2006/0070487 A1 * | 4/2006 | Hayashi | ................. | B60R 21/09 74/560 |
| 2007/0175692 A1 * | 8/2007 | Hasegawa | ............... | B60R 21/09 180/274 |

* cited by examiner

PEDAL REARWARD DISPLACEMENT PREVENTING STRUCTURE FOR VEHICLE

FIELD OF THE INVENTION

The present invention relates to a pedal rearward displacement preventing structure for a vehicle.

BACKGROUND ART

Generally, a vehicle such as an automobile is provided with a pedal rearward displacement preventing structure for preventing a rearward displacement of a pedal which would otherwise occur upon receiving a rearward load in the event of a vehicle frontal collision or the like. For example, upon receiving a rearward load in the event of a vehicle frontal collision, a brake pedal is displaced rearwardly, so that a load is input from the brake pedal to a driver's foot being depressing the brake pedal. The pedal rearward displacement preventing structure is used as a means to reduce this problem.

As a specific example of the pedal rearward displacement preventing structure, there has been known a pedal rearward displacement preventing structure comprising a cylindrical-shaped cross car beam, and a pedal rearward displacement preventing member supported by the cylindrical-shaped cross car beam, to prevent a rearward displacement of a brake pedal (see, for example, JP 2009-237844A which will hereinafter be referred to as Patent Document 1).

The inventors of the present invention have found that the above conventional structure has a new problem in terms of mechanical strength (particularly, rigidity) of the cross car beam. Specifically, it has been found that, in the conventional pedal rearward displacement preventing structure described, for example, in the Patent Document 1, the cross car beam can be relatively easily damaged when the cross car beam receives a load transmitted rearwardly from the brake pedal. This problem becomes prominent, particularly in a case where the cross car beam is formed of a fiber-reinforced resin, or formed as a hollow body, for the purpose of weight reduction.

The present invention has been made in view of solving the above conventional problem, and an object thereof is to provide a vehicle pedal rearward displacement preventing structure exhibiting better collision performance.

It is another object of the present invention to provide a vehicle pedal rearward displacement preventing structure exhibiting better collision performance and achieving a further reduction in weight.

SUMMARY OF THE INVENTION

In order to achieve the above object, the present invention provides a pedal rearward displacement preventing structure for a vehicle comprises: a cross car beam having a given axial direction and extending along the axial direction; a pedal rearward displacement preventing member attached to the cross car beam to prevent a rearward displacement of a brake pedal; and a center stay for supporting the cross car beam. The pedal rearward displacement preventing structure is characterized in that the pedal rearward displacement preventing member is disposed on a forward side of the center stay in a forward-rearward direction of the vehicle.

The pedal rearward displacement preventing structure of the present invention having the above feature can exhibit better collision performance.

Further, the pedal rearward displacement preventing structure of the present invention having the above feature can exhibit better collision performance and achieve a further reduction in weight.

Preferably, in the pedal rearward displacement preventing structure of the present invention, the cross car beam has a rectangular shape in cross-sectional view, wherein the rectangular shape has a top surface, a bottom surface, a front surface and a rear surface.

Preferably, in the pedal rearward displacement preventing structure of the present invention, the center stay comprises a rear surface support portion extending to cover the rear surface of the cross car beam, and at least one of a top surface support portion extending from the rear surface support portion to cover the top surface of the cross car beam and a bottom surface support portion extending from the rear surface support portion to cover the bottom surface of the cross car beam, and wherein the pedal rearward displacement preventing member has a rear end which is formed to cover the front surface of the cross car beam, and a front edge face of the at least one of the top surface support portion and the bottom surface support portion of the center stay.

More preferably, in the above pedal rearward displacement preventing structure, the rear end of the pedal rearward displacement preventing member is formed to cover the front surface of the cross car beam, the front edge face of the top surface support portion, and the front edge face of the bottom surface support portion.

More preferably, in the above pedal rearward displacement preventing structure, the center stay further comprises an angular C-shaped fixing section composed of a rear surface-side surface member provided between the rear surface support portion and the rear surface of the cross car beam, a top surface-side surface member provided between the top surface support portion and the top surface of the cross car beam, and a bottom surface-side surface member provided between the bottom surface support portion and the bottom surface of the cross car beam, and the pedal rearward displacement preventing member has a top surface-side extension piece extending parallel to the top surface of the cross car beam, and a bottom surface-side extension piece extending parallel to the bottom surface of the cross car beam, wherein the center stay, the pedal rearward displacement preventing member and the cross car beam are fastened together by three-component co-fastening for the angular C-shaped fixing section of the center stay, the top surface-side extension piece and the bottom surface-side extension piece of pedal rearward displacement preventing member, and the cross car beam.

More preferably, in the above pedal rearward displacement preventing structure, each of the top surface support portion and the bottom surface support portion extends up to a position of the front surface of the cross car beam, in the forward-rearward direction of the vehicle.

Preferably, in the pedal rearward displacement preventing structure of the present invention, the pedal rearward displacement preventing member has: a front end wall formed at a front end of the pedal rearward displacement preventing member and configured to receive an input of a rearward load transmitted from the brake pedal; a rear end wall formed at a rear end of the pedal rearward displacement preventing member; and a rib structure comprising a rib formed to extend from the rear end wall toward the front end wall.

More preferably, in the above pedal rearward displacement preventing structure, the rib of the pedal rearward displacement preventing member extends from the rear end wall in a direction perpendicular to the front surface of the cross car beam.

More preferably, in the above pedal rearward displacement preventing structure, the rib of the pedal rearward displacement preventing member extends from the rear end wall in a direction perpendicular to the front surface of the cross car beam and parallel to the top surface of the cross car beam.

Preferably, the pedal rearward displacement preventing structure of the present invention further comprises a steering device support member attached to the cross car beam to support a steering device.

More preferably, in the above pedal rearward displacement preventing structure, the pedal rearward displacement preventing member is fastened to the steering device support member.

More preferably, in the above pedal rearward displacement preventing structure, the steering device support member and the center stay are provided on the cross car beam in spaced-apart relation to each other, wherein the pedal rearward displacement preventing structure further comprises a reinforcing member provided to cover a part of the cross car beam located between the steering device support member and the center stay.

More preferably, in the above pedal rearward displacement preventing structure, the reinforcing member is fastened to both of the steering device support member and the center stay.

Preferably, in the pedal rearward displacement preventing structure of the present invention, the cross car beam is a hollow body formed of a fiber-reinforced resin, wherein the pedal rearward displacement preventing member is formed of a polymer material having a rigidity greater than that of the fiber-reinforced resin.

Preferably, in the pedal rearward displacement preventing structure of the present invention, the cross car beam is a draw-formed body.

Preferably, in the pedal rearward displacement preventing structure of the present invention, the vehicle is an automobile, wherein the given axial direction of the cross car beam is a direction extending in a direction identical to a width direction of the automobile.

DETAILED DESCRIPTION OF PREFERRED EMBODIMENTS OF THE INVENTION

[Pedal Rearward Displacement Preventing Structure]

A vehicle pedal rearward displacement preventing structure of the present invention is a structure for, upon receiving a rearward load in the event of a vehicle frontal collision, reducing an input of the load to to a driver's foot being depressing a brake pedal. In this specification, the term "vehicle" is used as a concept encompassing not only vehicles such as automobiles, buses, trucks and electric trains (railroad vehicles), but also any other vehicle (transporter) equipped with a steering device. For example, the term "vehicle" includes airplanes and marine vessels.

In this specification, the term "collision performance" primarily means performance based on mechanical performance (particularly, rigidity) of a cross car beam, more specifically, capability allowing a cross car beam to become less likely to reach cross-sectional breaking, even when receiving a force from a front end of the vehicle due to collision (collision resistance performance).

Further, the term "steering device vibration performance" means capability of preventing a vibration input to the pedal rearward displacement preventing structure from being transmitted to a steering device in the vehicle, thereby reducing a discomfort feeling which would otherwise be given to passengers such as a driver and a fellow passenger based on vibration. The steering device is a device for steering a vehicle, and, in the field of automobiles, examples thereof include a steering wheel to be manipulated by a driver.

Figure 1:
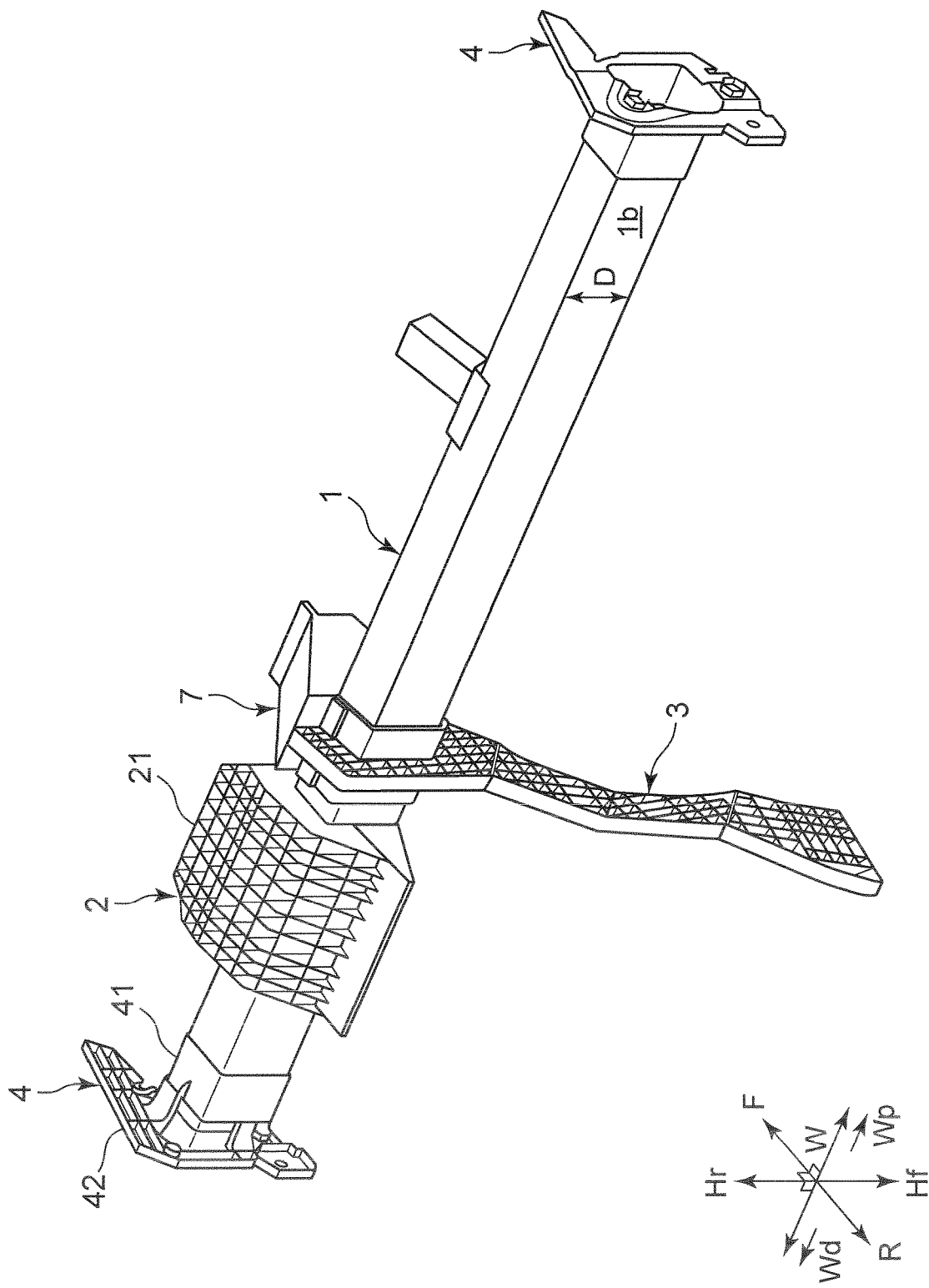
FIG. 1 is a schematic perspective view of a vehicle pedal rearward displacement preventing structure according to one embodiment of the present invention.
Figure 2:
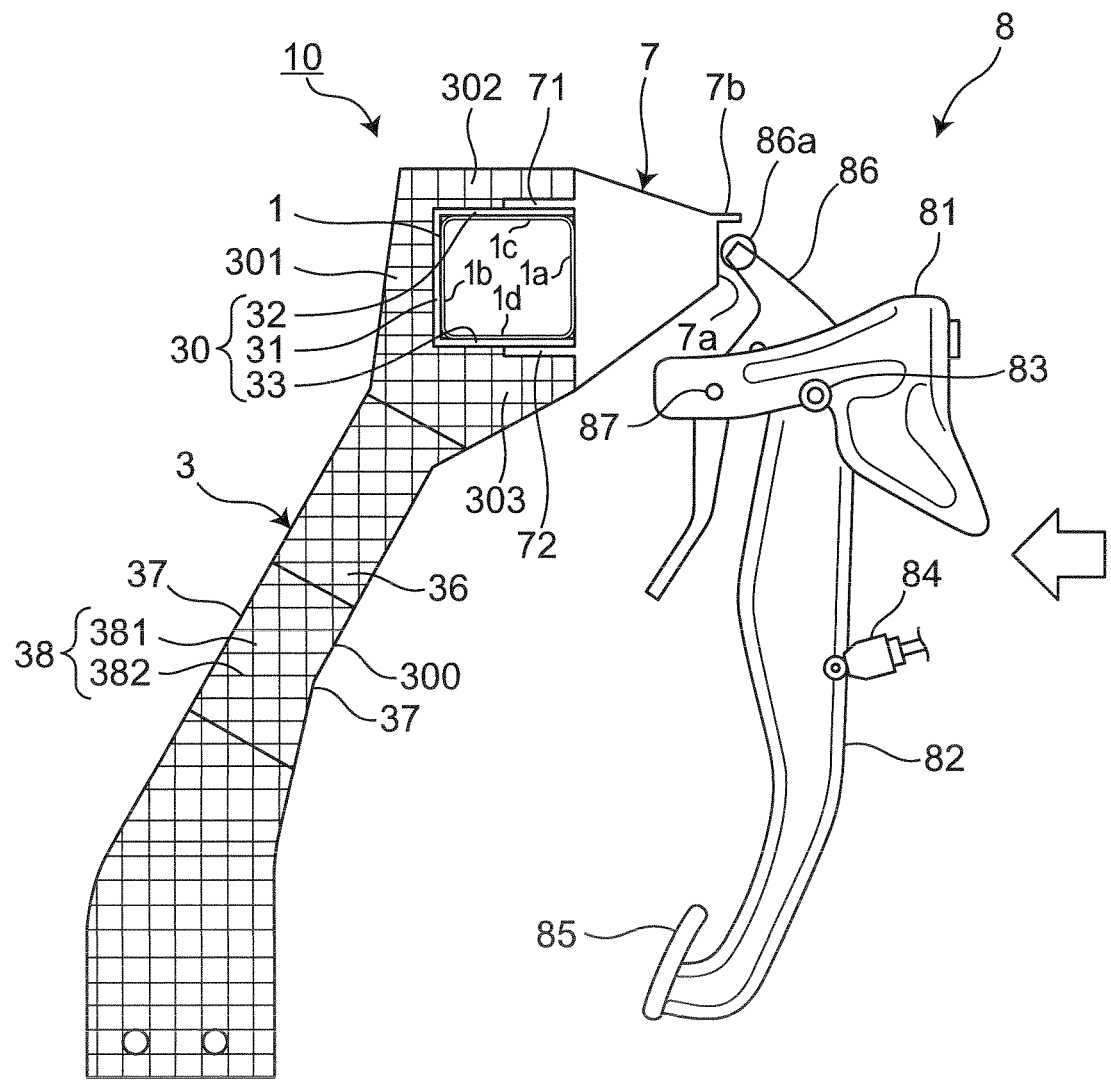
FIG. 2 is a side view depicting the vehicle pedal rearward displacement preventing structure in FIG. 1, and a brake pedal.
Figure 3:
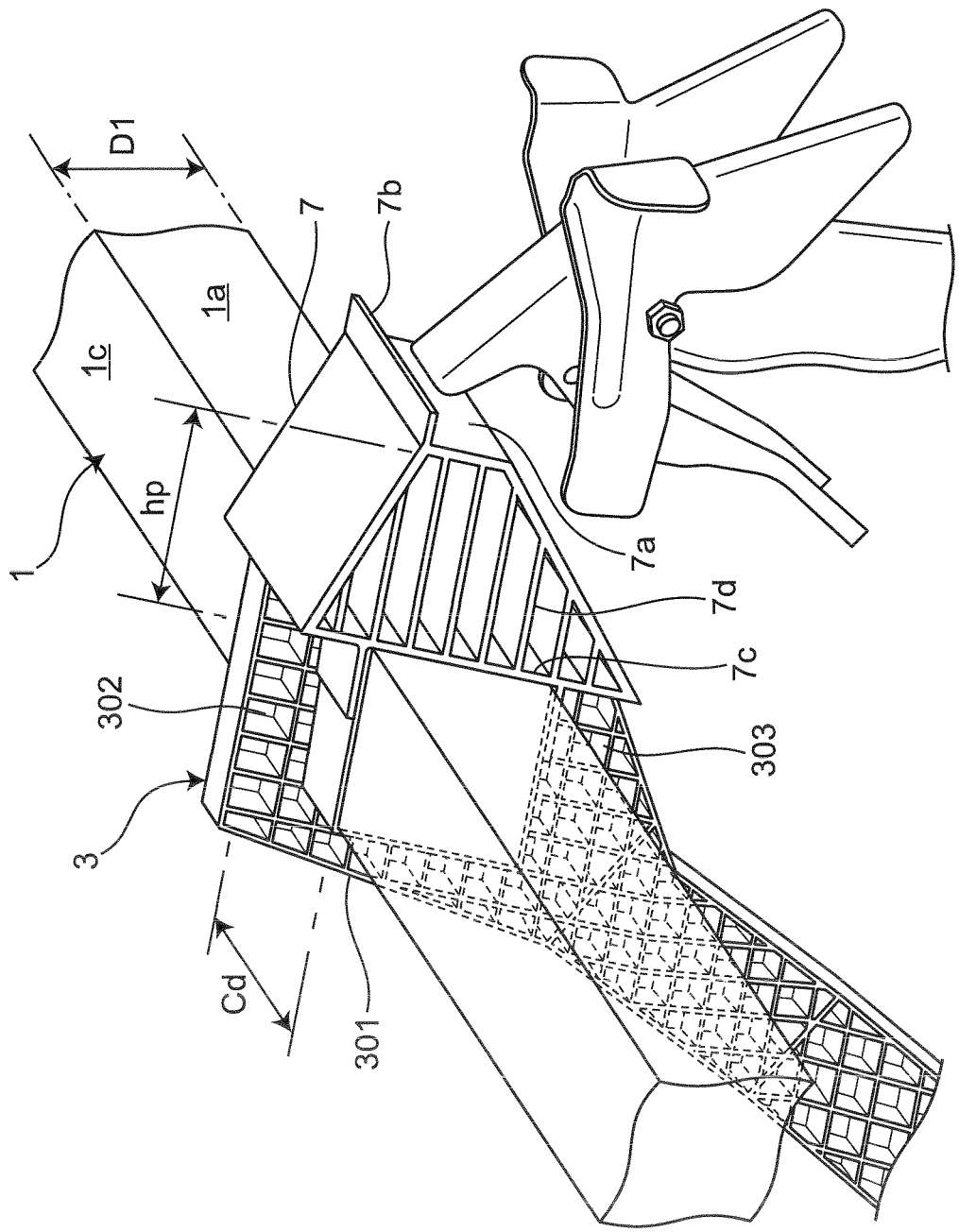
FIG. 3 is an enlarged perspective view of a vehicle pedal rearward displacement preventing member in the vehicle pedal rearward displacement preventing structure in FIG. 1, and the vicinity thereof.
Figure 4:
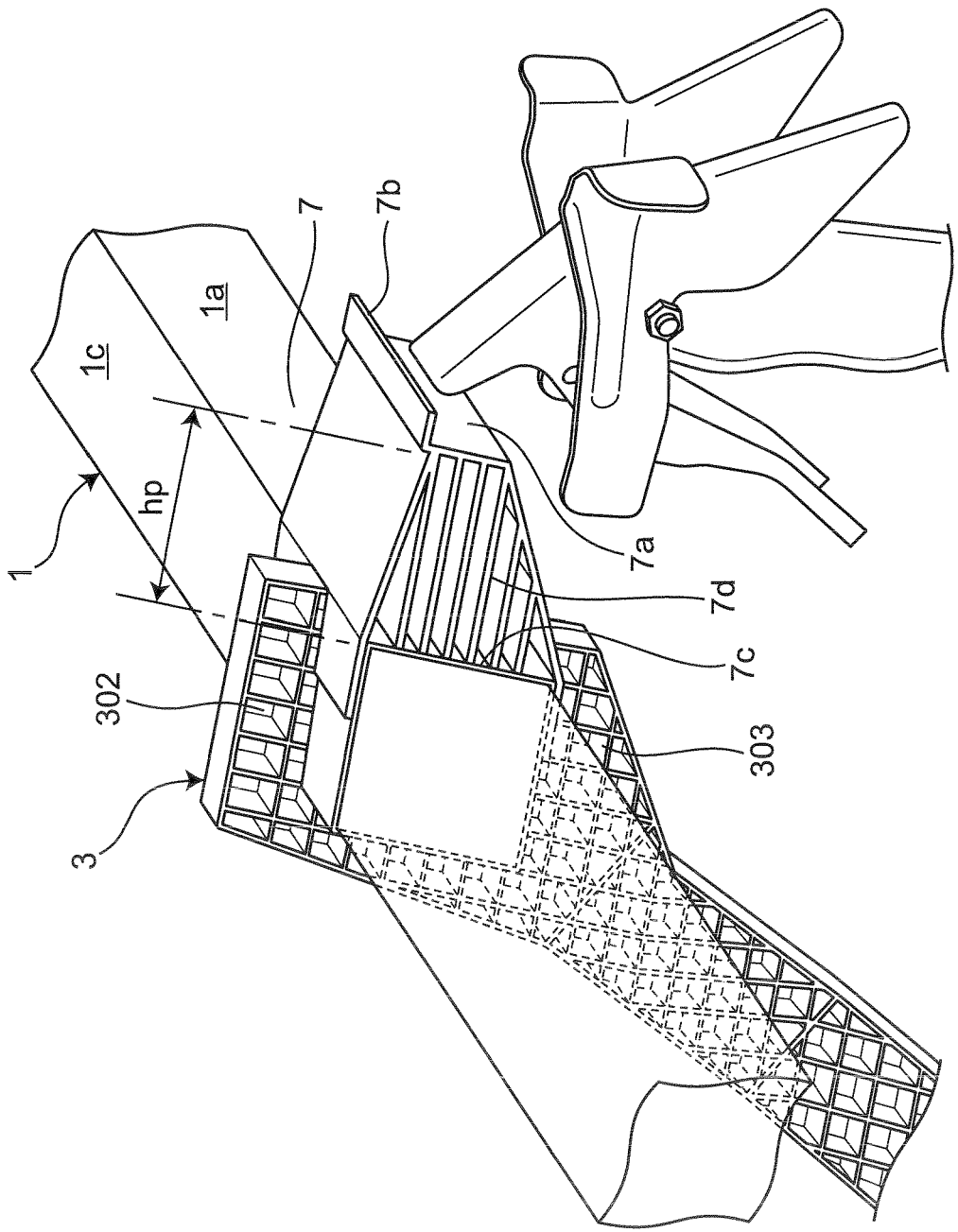
FIG. 4 is an enlarged perspective view of a vehicle pedal rearward displacement preventing member in a vehicle pedal rearward displacement preventing structure according to another embodiment of the present invention, and the vicinity thereof.
Figure 5:
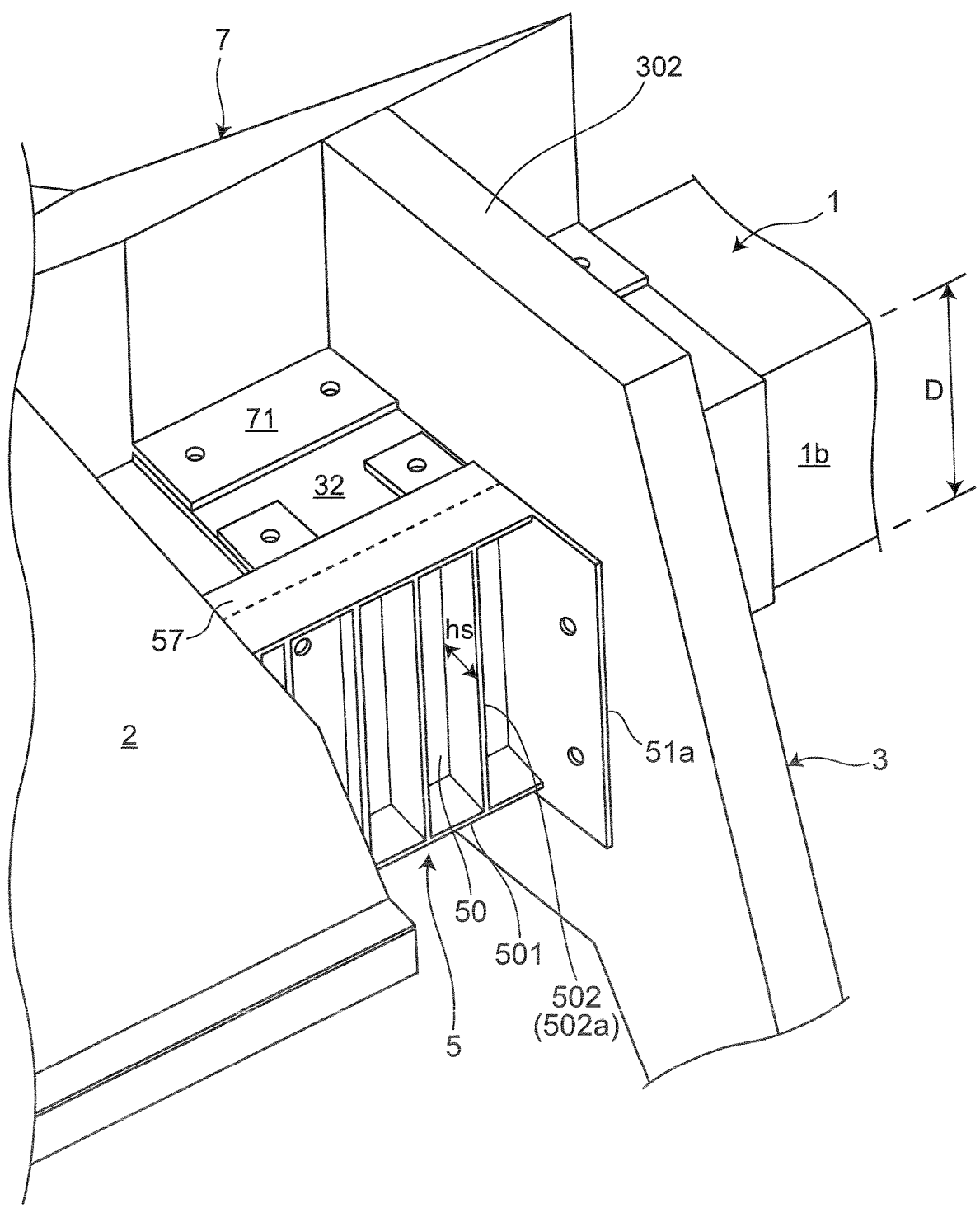
FIG. 5 is an enlarged perspective view of a vehicle pedal rearward displacement preventing member in a vehicle pedal rearward displacement preventing structure according to yet another embodiment of the present invention, and the vicinity thereof.

With reference to the drawings, a vehicle pedal rearward displacement preventing structure according to an embodiment of the present invention will now be described. This embodiment will be described based on an example in which the vehicle pedal rearward displacement preventing structure of the present invention is applied to an automobile. FIG. 1 is a schematic perspective view of a vehicle pedal rearward displacement preventing structure according to a first embodiment of the present invention. FIG. 2 is a side view depicting the vehicle pedal rearward displacement preventing structure in FIG. 1, and a brake pedal. FIG. 3 is an enlarged perspective view of a vehicle pedal rearward displacement preventing member in the vehicle pedal rearward displacement preventing structure in FIG. 1, and the vicinity thereof. FIG. 4 is an enlarged perspective view of a vehicle pedal rearward displacement preventing member in a vehicle pedal rearward displacement preventing structure according to a second embodiment of the present invention, and the vicinity thereof. FIG. 5 is an enlarged perspective view of a vehicle pedal rearward displacement preventing member in a vehicle pedal rearward displacement preventing structure according to a third embodiment of the present invention, and the vicinity thereof.

In the figures, the arrowed line F denotes a forward direction of the vehicle (vehicle forward direction) and the arrowed line R denotes a rearward direction of the vehicle (vehicle rearward direction). The arrowed line W denotes a width direction of the vehicle (vehicle width direction). The arrowed line Wd denotes one direction of the vehicle width direction W oriented from a front passenger seat side to a driver seat side in which an aftermentioned steering device support member is disposed (front passenger seat-to-driver seat direction), and the arrowed line Wp denotes the other direction of the vehicle width direction W oriented from the driver seat side to the front passenger seat side (driver seat-to-front passenger seat direction). The arrowed line Hr denotes one direction of a height direction of the vehicle (vehicle height direction) oriented from a floor to a roof of the vehicle (floor-to-roof direction), and the arrowed line Hf denotes the other direction of the vehicle height direction oriented from the roof to the floor of the vehicle (roof-to-floor direction). It should be noted that various elements depicted in the figures are schematically shown only for the sake of facilitating understanding of the present invention, and a dimensional ratio, an external appearance or the like can be different from that of an actual structure. The term "upward-downward direction" used directly or indirectly in this specification corresponds, unless otherwise specified, to an upward-downward direction in a state in which the pedal rearward displacement preventing structure is incorporated in a vehicle. A common reference sign in the figures denotes, unless otherwise specified, the same member, region, dimension or area.

The pedal rearward displacement preventing structure 10 according to the first embodiment comprises a cross car beam 1, a center stay 3, and a pedal rearward displacement preventing member 7. Typically, the pedal rearward displacement preventing structure 10 further comprises a steering device support member 2, and two side brackets 4.

(Cross Car Beam)

The cross car beam 1 has a given axial direction (which is identical to the vehicle width direction W). The cross car beam 1 is a member extending along its axial direction. The shape of the cross car beam 1 in a cross-sectional view taken along a plane perpendicular to the axial direction of the cross car beam 1 (cross-sectional shape of the cross car beam 1) is not particularly limited. For example, the cross-sectional shape of the cross car beam 1 may be a circular shape, a semicircular or sectoral shape, or may be a polygonal shape including a rectangular shape. Preferably, the cross-sectional shape of the cross car beam 1 is a rectangular shape. In this case, the collision performance of the pedal rearward displacement preventing structure is further improved. As used herein, the term "rectangular shape" has a concept encompassing a square shape and an elongated rectangular shape (rectangular shape except for a square shape). From the above viewpoint, the square shape is preferable. When the cross-sectional shape of the cross car beam 1 is a rectangular shape, the cross car beam 1 has a rectangular columnar shape in its entirety. The rectangular columnar shape also includes a case where the cross car beam 1 has a rectangular shape in cross-section, wherein the cross car beam 1 is formed as a hollow body, as will be described later.

In the case where the cross car beam 1 has a rectangular shape as a cross-sectional shape, the cross car beam 1 has a front surface, a rear surface, a top surface, and a bottom surface. The front surface, the rear surface, the top surface and the bottom surface of the cross car beam 1 means, respectively, a surface oriented in the vehicle forward direction (F), a surface oriented in the vehicle rearward direction (R), a surface oriented in the floor-to-roof direction (Hr), and a surface oriented in the roof-to-floor direction (Hf), and are denoted, respectively, by the reference signs 1a, 1b, 1c and 1d, for example, in FIG. 2. The cross car beam 1 is typically disposed such that the axial direction thereof becomes parallel to the vehicle width direction W.

The cross car beam 1 is preferably formed as a hollow body. This makes it possible to achieve a further reduction in weight of the pedal rearward displacement preventing structure. A material for the hollow body is not particularly limited. For example, the material may be a metal such as aluminum, iron, steel or an alloy thereof, or may be a resin such as a polymer, or a fiber-reinforced resin. From a viewpoint of a balance between a further reduction in weight and a further improvement in the collision performance, the material for the hollow body is preferably a fiber-reinforced resin. In this embodiment, the weight reduction is primarily achieved by forming the cross car beam 1 as a fiber-reinforced resin hollow body, and forming the pedal rearward displacement preventing member 7 using a polymer material.

The fiber-reinforced resin hollow body is a body impregnated with a curable resin and formed in an elongate shape in its entirety. The fiber-reinforced resin hollow body is not particularly limited, as long as the hollow body comprises a fiber layer containing reinforcement fibers, and a curable resin which has been cured after impregnating the fiber layer. Although the fibers in the resin layer may be uniformly dispersed in the curable resin, the fiber layer preferably comprises an axial fiber layer, from the viewpoint of a further improvement in the collision performance. The axial fiber layer means a fiber layer mainly containing reinforcement fibers oriented parallel to the axial direction (longitudinal direction) of the cross car beam. In this embodiment, the axial fiber layer is preferably a fiber layer consisting only of the reinforcement fibers, from the viewpoint of a further improvement in the collision performance.

As the reinforcement fiber, it is possible to use all types of fibers which have heretofore been used in the field of fiber-reinforced plastics. Examples of the reinforcement fiber include a glass fiber and a carbon fiber. Preferably, the reinforcement fiber is a glass fiber.

As the curable resin, it is possible to use all types of curable resins which have heretofore been used in a fiber-reinforced resin hollow body. Specific examples of the curable resin include thermosetting resins such as unsaturated polyester resin, epoxy resin, vinyl ester resin, and phenolic resin.

The curable resin may contain an additive such as a so-called catalyst, a release agent, a colorant, a shrinkage-reducing agent or a silane coupling agent.

In the case where the cross car beam 1 is formed as a hollow body, a material for the cross car beam 1 may have any thickness, wherein the thickness may be appropriately determined depending on the intended use of the pedal rearward displacement preventing structure. In the case where the pedal rearward displacement preventing structure is used in a vehicle, particularly in an automobile, from the viewpoint of a further reduction in weight and a further improvement in the collision performance in the pedal rearward displacement preventing structure, the cross car beam 1 has a thickness of typically 1 to 20 mm, particularly 1 to 10 mm, preferably 1 to 3 mm. The thickness means a wall thickness of a material for the cross car beam 1.

The cross car beam 1 may have any outer peripheral length, wherein the outer peripheral length may be appropriately determined depending on the intended use of the pedal rearward displacement preventing structure. In the case where the pedal rearward displacement preventing structure is used in a vehicle, particularly in an automobile, the cross car beam 1 has an outer peripheral length of, e.g., 125 to 300 mm. The outer peripheral length of the cross car beam 1 means an outer peripheral length of a cross-section of the cross car beam 1 taken along a plane perpendicular to the axial direction of the cross car beam 1. In the case where the cross car beam 1 has a cross-sectionally rectangular shape, the length of one side of the cross-sectional shape of the cross car beam 1 is not particularly limited. For example, the length may be from 45 to 75 mm.

Preferably, the cross car beam 1 is a draw-formed body. A cross-sectional shape of a draw-formed body is typically constant in its axial direction. Particularly in the case where the cross car beam 1 is formed as the fiber-reinforced resin hollow body, the fiber-reinforced resin hollow body can be produced by the following draw forming process. For example, the draw forming process comprises: impregnating reinforcement fibers forming an axial fiber layer, with a curable resin; drawing the reinforcement fibers impregnated with the curable resin, from one end of a die having a cross-sectional shape equal to that of the hollow body; and sufficiently curing the curable resin within the die by heating. An obtained fiber-reinforced resin hollow body is continuously taken out of the die, and subjected to post-processing, e.g., of cutting the hollow body into a given length by a cutting machine.

The cross car beam 1 is formed with a plurality of fastening holes. These fastening holes are formed at appropriate positions so as to achieve fastening between the cross car beam 1 and each of the center stay 3, the pedal rearward displacement preventing member 7, the steering device support member 2, the side brackets 4 and the reinforcing member 5. In this specification, the fastening may be achieved by one or more fasteners selected from the group consisting of a rivet, a bolt, a screw, a pin, a staple, a strap, a stitch and any other fastener. Specifically, the fastener is preferably a rivet, a bolt, a screw or a pin, wherein an adhesive may be used in combination. More preferably, the fastener is a rivet and a bolt, wherein an adhesive may be used in combination.

In this specification, the term "fastening" is used as a concept of fixing two or more members together and encompassing fastening using an adhesive in combination. The fastening using an adhesive in combination means fastening two members while interposing an adhesive layer therebetween. Such fastening will hereinafter be referred to as "bonding". Therefore, from the viewpoint of a further improvement in the collision performance of the pedal rearward displacement preventing structure 10, any fastening in the present invention is preferably bonding.

(Steering Device Support Member)

The pedal rearward displacement preventing structure 10 needs not comprise the steering device support member 2. However, from the viewpoint of a further improvement in the collision performance of the pedal rearward displacement preventing structure 10, it is preferable that the pedal rearward displacement preventing structure 10 comprises the steering device support member 2, wherein the pedal rearward displacement preventing member 7 is fastened to the steering device support member 2. From the same viewpoint, it is more preferable that the pedal rearward displacement preventing structure 10 comprises the steering device support member 2 and the reinforcing member 5 which will be described in detail later, wherein the pedal rearward displacement preventing member 7 is fastened to the steering device support member 2, and the reinforcing member 5 is fastened to the steering device support member 2 and the center stay 3.

The steering device support member 2 has a function of supporting the steering device while being supported by the cross car beam 1. The steering device support member 2 is typically configured such that a front end 21 thereof receives a forward-rearward directional (F-R directional) force from a cowl (front portion of a vehicle body of the vehicle) (not depicted). This makes it possible to prevent a forward movement of the cross car beam during collision. From the viewpoint of a further improvement in the steering device vibration performance, the steering device support member 2 is preferably configured such that the front end 21 thereof is fixed to the cowl or a cowl bracket connected to the cowl. The front end 21 of the steering device support member 2 means one end of the steering device support member 2 on a forwardmost side in the vehicle forward direction F. Typically, the cowl is a member extending in the vehicle width direction to improve the collision performance. For example, in an automobile, the cowl is disposed along a rearwardmost edge of a hood. Fixing between the cowl and the steering device support member may be achieved in a direct manner, or may be achieved in an indirect manner through a rod-shaped cowl bracket. The steering device is a device for steering a vehicle, such as a steering wheel in an automobile.

The steering device support member 2 is formed with a plurality of fastening holes. These fastening holes are formed at appropriate positions so as to achieve fastening between the steering device support member 2 and at least one of the pedal rearward displacement preventing member 7, the cross car beam 1 and the reinforcing member 5, and fastening between the steering device support member 2 and the cowl. In particular, the fastening between the steering device support member 2 and the pedal rearward displacement preventing member 7 is typically achieved by two-component co-fastening for them. Similarly, the fastening between the steering device support member 2 and the cross car beam 1 is typically achieved by two-component co-fastening for them.

A material for the steering device support member 2 is not particularly limited. For example, the material may be a metal such as aluminum, iron, steel or an alloy thereof, or may be a resin such as a polymer, or a fiber-reinforced resin. From the viewpoint of a further reduction in weight, the material for the steering device support member 2 is preferably a polymer material. The polymer material for the steering device support member 2 is not particularly limited. Examples of the polymer material may include a polyamide-based resin, a polyacrylic-based resin, a polyester-based resin, a polycarbonate-based resin, a polyolefin-based resin, a polyphenylene sulfide-based resin, FRP (fiber-reinforced plastic), and FRTP (fiber-reinforced thermo-plastic). Preferably, the polymer material is FRTP or a polyamide-based resin. In the case where the steering device support member 2 is formed of the polymer material, it can be produced by, e.g., injection molding.

(Center Stay)

The center stay 3 is a member having a function of supporting the cross car beam 1 in its center portion, from the bottom of the vehicle (in this embodiment, a floor panel of the automobile) (not depicted). The central portion means a portion of the cross car beam 1 extending between opposite ends thereof, and typically a portion of the cross car beam 1 extending between the driver seat and the front passenger seat in the axial direction of the cross car beam 1. The center stay 3 typically comprises an angular C-shaped fixing section 30 fixed to the cross car beam 1 so as to cover a portion of the cross car beam 1, and a stay body 300 supporting the fixed portion 30.

One preferred example of the center stay 3 will be described below.

Typically, the center stay 3 is provided to cover the rear surface 1b, the top surface 1c and the bottom surface 1d of the cross car beam 1. Specifically, as depicted in FIG. 2, the center stay 3 for supporting the cross car beam 1 comprises a stay body 300 extending from the bottom (not depicted) of the vehicle in a vehicle upward direction, a rear surface support portion 301, a top surface support portion 302 and a bottom surface support portion 303 which are provided at an upper (vehicle upward side) end of the stay body 300. The rear surface support portion 301 is a part of the upper end of the stay body 300 extending to cover the rear surface 1b of the cross car beam 1 to support the rear surface 1b. The top surface support portion 302 a part of the upper end of the stay body 300 extending to cover the top surface 1c of the cross car beam 1 to support the top surface 1c, and the bottom surface support portion 303 a part of the upper end of the stay body 300 extending to cover the bottom surface 1d of the cross car beam 1 to support the bottom surface 1d.

In this embodiment, the center stay 3 comprise the rear surface support portion 301, the top surface support portion 302 and the bottom surface support portion 303, and as depicted in FIG. 2. However, the center stay 3 may comprise the rear surface support portion 301 and one of the top surface support portion 302 and the bottom surface support portion 303. Nevertheless, from the viewpoint of a further improvement in the collision performance of the pedal rearward displacement preventing structure 10, the center stay 3 preferably comprises both of the top surface support portion 302 and the bottom surface support portion 303, in addition to the rear surface support portion 301. In this embodiment, the center stay 3 comprise the rear surface support portion 301, the top surface support portion 302 and the bottom surface support portion 303, and the front surface of the cross car beam 1 and respective front edge faces of the top surface support portion 302 and the bottom surface support portion 303 are covered by a rear end of the pedal rearward displacement preventing member 7. In this case, the collision performance of the pedal rearward displacement preventing structure 10 is further improved.

In this embodiment, each of the top surface support portion 302 and the bottom surface support portion 303 is formed to cover a corresponding one of the top surface 1c and the bottom surface 1d, over the overall length thereof in a vehicle longitudinal direction, as depicted in FIG. 2. However, each of the top surface support portion 302 and the bottom surface support portion 303 needs not necessarily be formed to cover the corresponding one of the top surface 1c and the bottom surface 1d, over the overall length thereof. For example, each of the top surface support portion 302 and the bottom surface support portion 303 may be formed to cover at least a part of the corresponding one of the top surface 1c and the bottom surface 1d, individually. Nevertheless, from the viewpoint of a further improvement in the collision performance, each of the top surface support portion 302 and the bottom surface support portion 303 is preferably formed to cover the corresponding one of the top surface 1c and the bottom surface 1d, over the overall length thereof in the vehicle longitudinal direction. The vehicle longitudinal direction means the vehicle forward-rearward direction (F-R direction).

As depicted in FIG. 2, at least one, preferably each, of the top surface support portion 302 and the bottom surface support portion 303 preferably extends up to a position of the front surface 1a of the cross car beam 1 in the vehicle longitudinal direction. That is, the front edge face of at least one, preferably each, of the top surface support portion 302 and the bottom surface support portion 303 preferably become flush with the front surface 1a of the cross car beam 1.

Each of the heights of the top surface support portion 302, the bottom surface support portion 303 and the front edge faces thereof is typically set to 0.1×D or more, preferably the range of 0.2×D to 2×D, more preferably the range of 0.2×D to 1×D, individually, where D denotes the width (mm) of the rear surface 1b of the cross car beam 1. The height of the front edge face means a height dimension in the vehicle upward-downward direction.

The center stay 3 may be configured such that the rear surface support portion 301, the top surface support portion 302 and the bottom surface support portion 303 cover the rear surface 1b, the top surface 1c and the bottom surface 1d through three surface members, respectively. Specifically, a first surface member (rear surface-side surface member) 31 is formed between the rear surface support portion 301 and the rear surface 1b. Further, a second surface member (top surface-side surface member) 32 is formed between the top surface support portion 302 and the top surface 1c, and a third surface member (bottom surface-side surface member) 33 is formed between the bottom surface support portion 303 and the bottom surface 1d. The first to third surface members 31, 32, 33 are integrated with the stay body 300 (the rear surface support portion 301, the top surface support portion 302 and the bottom surface support portion 303). The first to third surface members 31, 32, 33 are used for fixing and fastening of the center stay 3 to the cross car beam 1, and form the angular C-shaped fixing section 30. Fastening between the first to third surface members 31, 32, 33, aftermentioned top surface-side extension piece and bottom surface-side extension piece of the pedal rearward displacement preventing member 7, and the cross car beam, may be achieved by three component co-fastening.

As depicted in FIG. 2, each of the second surface member 32 and the third surface member 33 are formed to cover a corresponding one of the top surface 1c and the bottom surface 1d over the overall length thereof in the vehicle longitudinal direction. However, each of the second surface member 32 and the third surface member 33 needs not necessarily be formed to cover the corresponding one of the top surface 1c and the bottom surface 1d, over the overall length thereof. For example, each of the second surface member 32 and the third surface member 33 may be formed to cover at least a part of the corresponding one of the top surface 1c and the bottom surface 1d, individually. Nevertheless, from the viewpoint of a further improvement in the collision performance, each of the second surface member 32 and the third surface member 33 is preferably formed to cover the corresponding one of the top surface 1c and the bottom surface 1d, over the overall length thereof in the vehicle longitudinal direction. Each of the first to third surface members 31, 32, 33 is typically fixed such that an inner surface thereof comes into surface contact with the cross car beam. This makes it possible to achieve a further improvement in the collision performance. In this specification, the term "surface contact" means not only a contact of two surfaces but also a contact thereof while interposing an adhesive layer therebetween.

A vehicle width-directional width Cd (FIG. 3) of each of the first to third surface members 31, 32, 33 of the center stay 3 is typically equal to or greater than 0.5×D, preferably from 0.6×D to 3×D, more preferably from 0.7×D to 2×D, where D (FIG. 1) denotes the width (mm) of the rear surface 1b of the cross car beam 1.

The stay body 300 of the center stay 3 may have a solid plate-like structure. However, from the viewpoint of a further reduction in weight and a further improvement in the collision performance, the stay body 300 preferably has the following center stay rib structure, as depicted in FIGS. 1 to 5.

Specifically, the stay body 300 preferably has a center stay rib structure which comprises: a surface member 36; an outer edge rib 37 provided to extend from an outer edge of the surface member 36 in a direction perpendicular to the surface member 36; and an inner rib 38 provided on an inner side of the outer edge rib to extend from the surface member 36 in the direction perpendicular to the surface member 36.

In the center stay rib structure, a plan-view shape of each of a plurality of spaces defined by the ribs may be a polygonal shape such as a tetragonal shape, a pentagonal shape or a hexagonal shape. Thus, this rib structure includes a honeycomb structure in which the plan-view shape of each of the plurality of spaces is a hexagonal shape.

From the viewpoint of a further improvement in the collision performance, the inner rib 38 preferably includes a plurality of ribs extending on the surface member 36 in two mutually-orthogonal directions. From the same view point, the inner rib preferably includes a perpendicular rib (281) and a width-directional rib (382). The perpendicular rib is a rib extending in a roof-floor direction (Hr-Hf direction). The width-directional rib is a rib extending on the surface member 36 in a direction perpendicular to the roof-floor direction (Hr-Hf direction). Although each of the perpendicular and width-directional ribs in FIGS. 1 to 5 typically has even height, the rib structure is not limited thereto, but the width-directional rib may have a height lower than that of the perpendicular rib.

Each of the rib heights of the outer edge rib and the inner rib of the center stay 3 is typically set to 0.1×D or more, preferably the range of 0.1×D to 1×D, more preferably the range of 0.2×D to 0.5×D, individually, where D denotes the width (mm) of the rear surface 1b of the cross car beam 1.

In the center stay 3, the thickness of each of the surface member, the outer edge rib and the inner rib is not particularly limited, but may be appropriately determined depending on the intended use of the pedal rearward displacement preventing structure. In the case where the pedal rearward displacement preventing structure is used in a vehicle, particularly in an automobile, each of the thicknesses of the surface member, the outer edge rib and the inner rib of the center stay 3 is set to, e.g., the range of 0.5 to 10 mm, preferably the range of 0.5 to 3 mm, individually.

Although each of the outer edge rib and the inner rib of the center stay 3 in FIGS. 1 to 5 is provided to extend from the surface member 36 positioned at the driver seat side, toward the front passenger seat side, the rib structure is not limited thereto, but each of the outer edge rib and the inner rib of the center stay 3 may be provided to extend from the surface member positioned at the front passenger seat side, toward the driver seat side. From the viewpoint of a further improvement in the collision performance, each of the outer edge rib and the inner rib of the center stay 3 is preferably provided to extend from the surface member 36 positioned at the driver seat side, toward the front passenger seat side.

Typically, fastening between the center stay 3 and the cross car beam 1 is achieved by two-component co-fastening for these two components, and/or three-component co-fastening for the two components and one of the pedal rearward displacement preventing member 7 and the reinforcing member 5 which will be described in detail later.

The center stay 3 is formed with a plurality of fastening holes. These fastening holes are formed at appropriate positions so as to achieve fastening among the center stay 3, the cross car beam 1 and one of the pedal rearward displacement preventing member 7 and the reinforcing member 5, or fastening between the center stay 3 and the cross car beam 1.

A material for the center stay 3 is not particularly limited. Examples of the material may include the same materials as those for the steering device support member 2. From the viewpoint of a further reduction in weight and a further improvement in the collision performance, the material for the center stay 3 is preferably a polymer material. The polymer material for the center stay 3 is not particularly limited. Examples of the polymer material may include the same polymer materials as those for the steering device support member 2. Preferably, the polymer material is FRTP or a polyamide-based resin. In the case where the center stay 3 is formed of the polymer material, it can be produced by, e.g., injection molding.

(Side Brackets)

The pedal rearward displacement preventing structure 10 typically comprise the side brackets 4 although it needs not comprise the side brackets 4.

The side brackets 4 are fixing members for fixing the cross car beam 1 to the body of the vehicle (vehicle body) while supporting the cross car beam 1 at opposite ends thereof. As depicted in FIG. 1, each of the side brackets 4 comprises an attaching portion 41 formed to surround an outer periphery of a corresponding one of the opposite ends of the cross car beam 1 so as to achieve fastening between the cross car beam 1 and the side bracket 4, and a flange portion 42 for fixing the side bracket 4 to the vehicle body.

Typically, fastening between the side bracket 4 and the cross car beam 1 is achieved by two-component co-fastening for these two components.

The side bracket 4 is formed with a plurality of fastening holes. These fastening holes are formed at appropriate positions so as to achieve fastening between the side bracket 4 and at least one of the cross car beam 1 and the reinforcing member 5.

A material for the side bracket 4 is not particularly limited. Examples of the material may include the same materials as those for the steering device support member 2. From the viewpoint of a further reduction in weight and a further improvement in the collision performance, the material for the side bracket 4 is preferably a polymer material. The polymer material for the side bracket 4 is not particularly limited. Examples of the polymer material may include the same polymer materials as those for the steering device support member 2. Preferably, the polymer material is FRTP or a polyamide-based resin. In the case where the side bracket 4 is formed of the polymer material, it can be produced by, e.g., injection molding.

(Pedal Rearward Displacement Preventing Member)

The pedal rearward displacement preventing member 7 is a member for preventing a rearward displacement of a brake pedal, while being supported by the cross car beam 1. More specifically, the pedal rearward displacement preventing member 7 is operable, upon receiving a rearward load in the event of a vehicle frontal collision or the like, to reduce an input of the load to a driver's foot being depressing the brake pedal.

In the present invention, the pedal rearward displacement preventing member 7 is disposed on a forward side of the center stay 3 in the vehicle longitudinal direction. This makes it possible to receive the rearward load input to the pedal rearward displacement preventing member 7, by not only the cross car beam 1 (and the side brackets 4 supporting the cross car beam 1) but also the center stay 3. Therefore, the collision performance is improved.

As depicted in FIGS. 2 to 4, at a front end of the pedal rearward displacement preventing member 7, a front end wall 7a is formed to which a rearward load is input from the brake pedal according to a depressing force of a driver. Further, a stopper piece 7b is formed on an upper region of a forwardly-facing surface of the front wall 7a to extend forwardly. Typically, a rear end wall 7c is formed at the rear end the pedal rearward displacement preventing member 7. As depicted in FIGS. 1 to 5, the area S2 of the rear end wall 7c is greater than the area S1 of the front end wall 7a. From the viewpoint of a further improvement in the collision performance, the area S2 of the rear end wall 7c is preferably from 1.1×S1 to 4×S1, more preferably from 1.2×S1 to 2×S1, with respect to the area S1 of the front end wall 7a. The area of the rear end wall 7c means the area of a rearwardly-facing surface of the rear end wall 7c. The area of the front end wall 7a means the area of the forwardly-facing surface of the front end wall 7a.

The pedal rearward displacement preventing member 7 is configured such that the rear end thereof covers at least the front surface 1a of the cross car beam 1, and preferably covers the front surface 1a, and the front edge face of at least one of (preferably, each of) the top surface support portion 302 and the bottom surface support portion 303 of the center stay 3, from from the viewpoint of a further improvement in the collision performance. By configuring the pedal rearward displacement preventing member 7 such that the rear end thereof covers not only the front surface 1a but also the front edge face of at least one of (particularly, each of) the top surface support portion 302 and the bottom surface support portion 303 of the center stay 3, the center stay 3 can further sufficiently receive the rearward load. Therefore, the collision performance is further improved.

In FIG. 3, the pedal rearward displacement preventing member 7 is configured such that the rear end thereof covers the front surface 1a of the cross car beam 1, and respective front edge faces of the top surface support portion 302 and the bottom surface support portion 303 of the center stay 3. In this case, in cross-sectional view, a closed structure is formed by the pedal rearward displacement preventing member 7, and the center stay 3 (particularly, the rear surface support portion 301, the top surface support portion 302 and the bottom surface support portion 303). This closed structure means that, in cross-sectional view, a continuous closed loop is formed by only the above members. This makes it possible to achieve a further improvement in the collision performance. On the other hand, in a pedal rearward displacement preventing structure according to an another embodiment of the present invention depicted in FIG. 4, a pedal rearward displacement preventing member 7 is configured such that a rear end thereof covers only the front surface 1a of the cross car beam 1, so that the above closed structure is not formed in cross-sectional view. The pedal rearward displacement preventing structure in FIG. 4 is the same as the pedal rearward displacement preventing structure in FIG. 3, except that they are different from each other, only in terms of the size of the pedal rearward displacement preventing member (particularly, the size of the rear end thereof).

As depicted in FIG. 2, the pedal rearward displacement preventing member 7 typically comprises a top surface-side extension piece 71 extending parallel to the top surface 1c of the cross car beam 1, and a bottom surface-side extension piece 72 extending parallel to the bottom surface 1d of the cross car beam 1. Although each of the top surface-side extension piece 71 and the bottom surface-side extension piece 72 is formed to cover a corresponding one of respective outer surfaces of the second surface members 32 and the third surface member 33, as depicted in FIG. 2, the covering structure is not limited thereto. For example, each of the top surface-side extension piece 71 and the bottom surface-side extension piece 72 may be formed to directly cover a corresponding one of the top surface 1c and the bottom surface 1d of the cross car beam 1. In this case, each of the second surface members 32 and the third surface member 33 may cover a corresponding one of respective outer surfaces of the top surface-side extension piece 71 and the bottom surface-side extension piece 72.

As depicted in FIG. 5, the pedal rearward displacement preventing member 7 may have a plurality of fastening holes formed in the top surface-side extension piece 71. The pedal rearward displacement preventing member 7 may also have a plurality of fastening holes formed in the bottom surface-side extension piece 72, in the same manner as that in the top surface-side extension piece 71. In an overlapping area among the surface member (32 or 33) of the center stay 3, the extension piece (the top surface-side extension piece 71 or the bottom surface-side extension piece 72) of the pedal rearward displacement preventing member 7, and the cross car beam 1, fastening between the cross car beam 1 and each of the center stay 3 and the pedal rearward displacement preventing member 7 may be achieved by three-component co-fastening.

Although each of the top surface-side extension piece 71 and the bottom surface-side extension piece 72 in FIGS. 1 to 5 is formed to cover a corresponding one of the second surface member 32 and the third surface member 33 of the center stay 3 over part of the overall length thereof, it may be formed to cover the corresponding surface member over the overall length thereof. From the viewpoint of a further improvement in the collision performance, each of the top surface-side extension piece 71 and the bottom surface-side extension piece 72 is preferably formed to cover the corresponding one of the second surface member 32 and the third surface member 33 of the center stay 3 over 20 to 100%, preferably 30 to 100%, of the overall length thereof in the vehicle longitudinal direction.

Each of the top surface-side extension piece 71 and the bottom surface-side extension piece 72 may have a vehicle width-directional width selected from the same range as that for the vehicle width-directional width Cd (FIG. 3) of each of the first to third surface members of the center stay 3, individually. Typically, the vehicle width-directional width of each of the top surface-side extension piece 71 and the bottom surface-side extension piece 72 has the same value as that of the vehicle width-directional width Cd (FIG. 3) of each of the first to third surface members of the center stay 3. In FIGS. 1 to 3, the top surface-side extension piece 71 has a cutout to be fittingly engaged with the top surface support portion 302 of the center stay 3. In the case where the top surface-side extension piece 71 has the cutout, the vehicle width-directional width of the top surface-side extension piece 71 is a width as measured on the assumption that it does not have the cutout. The same is applied to the bottom surface-side extension piece 72.

The pedal rearward displacement preventing member 7 may have a solid structure. However, from the viewpoint of a further reduction in weight and a further improvement in the collision performance, the pedal rearward displacement preventing member 7 preferably has the following rib structure, as depicted in FIGS. 3 and 4.

Specifically, the pedal rearward displacement preventing member 7a preferably has: the front end wall 7a formed at the front end of the pedal rearward displacement preventing member 7 and configured to receive an input of a rearward load transmitted from the brake pedal; the rear end wall 7c formed at the rear end of the pedal rearward displacement preventing member 7; and a rib structure comprising a rib 7d formed to extend from the rear end wall 7c toward the front end wall 7a.

As depicted in FIGS. 3 and 4, the pedal rearward displacement preventing member 7 needs not have sidewalls at vehicle width-directional opposite ends thereof. However, from the viewpoint of a further improvement in the collision performance, the pedal rearward displacement preventing member 7 preferably has the sidewalls.

From the viewpoint of a further improvement in the collision performance, the rib 7d is preferably formed to extend from the rear end wall 7c in a direction perpendicular to the front surface 1a of the cross car beam 1. From the same viewpoint, the rib 7d is more preferably formed to extend from the rear end wall 7c in a direction perpendicular to the front surface 1a of the cross car beam 1 and parallel to the top surface 1c of the cross car beam, as depicted in FIGS. 3 and 4.

The maximum height hp (FIGS. 3 and 4) (maximum length in the vehicle longitudinal direction) of the rib 7d is typically equal to or greater than 0.5×D1, preferably from 0.6×D1 to 3×D1, more preferably the range of 0.7×D1 to 2×D1, where D1 (FIG. 3) denotes the width (mm) of the front surface 1a of the cross car beam 1.

Each of the thicknesses of the front end wall 7a, the stopper piece 7b, the rear end wall 7c and the rib 7d is not particularly limited, but but may be appropriately determined depending on the intended use of the pedal rearward displacement preventing structure. In the case where the pedal rearward displacement preventing structure is used in a vehicle, particularly in an automobile, each of the thicknesses of the front end wall 7a, the stopper piece 7b, the rear end wall 7c and the rib 7d is set to, e.g., the range of 1 to 10 mm, preferably the range of 1 to 5 mm, individually.

The pedal rearward displacement preventing member 7 is typically disposed to come into surface contact with the front surface 1a of the cross car beam 1, and the second and third surface members 32, 33 of the center stay 3 (or the top surface 1c and the bottom surface 1d of the cross car beam 1).

The pedal rearward displacement preventing member 7 is typically formed with a plurality of fastening holes, and fastened to the center stay 3 and the cross car beam 1 by three-component co-fastening. For example, as depicted in FIG. 5, in an overlapping area among the surface member (32 or 33) of the center stay 3, the extension piece (the top surface-side extension piece 71 or the bottom surface-side extension piece 72) of the pedal rearward displacement preventing member 7, and the cross car beam 1, fastening between the cross car beam and each of the center stay 3 and the pedal rearward displacement preventing member 7 is achieved by three-component co-fastening. This makes it possible to further improve the collision performance.

The number of fastening points between the pedal rearward displacement preventing member 7 and other member is typically four or more. Preferably, the number may be increased to eight or more, depending on the size of the pedal rearward displacement preventing member 7.

When the pedal rearward displacement preventing member 7 is directly fastened to the steering device support member 2, the pedal rearward displacement preventing member 7 becomes less likely to undergo torsional deformation in the axial direction of the cross car beam 1, but instead becomes more likely to undergo flexural deformation. If the pedal rearward displacement preventing member 7 is more likely to undergo torsional deformation, a vibration input thereto is easily transmitted. On the other hand, if the pedal rearward displacement preventing member 7 is less likely to undergo torsional deformation and more likely to undergo flexural deformation, a vibration input thereto is hardly transmitted. This prevents vibration transmission to a passenger to thereby improve the steering device vibration performance.

Direct fastening of the pedal rearward displacement preventing member 7 to the steering device support member 2 may be achieved by providing a support portion (not depicted) to the rear end wall 7c of the pedal rearward displacement preventing member 7 on the side of the cross car beam 1, and directly fastening the pedal rearward displacement preventing member 7 to a side surface of the steering device support member 2 by using a fastening hole formed in the support portion. The support portion is formed on an end region of the cross car beam-side (rearwardly-facing) surface of the rear end wall 7c on the side of the steering device support member 2, to extend along a surface of the steering device support member 2.

A material for the pedal rearward displacement preventing member 7 is not particularly limited. Examples of the material may include the same materials as those for the steering device support member 2. In the case where the cross car beam 1 is formed of a fiber-reinforced resin, from the viewpoint of a further reduction in weight and a further improvement in the collision performance, the material for the pedal rearward displacement preventing member 7 is preferably a polymer material having a rigidity greater than that of the fiber-reinforced resin. For example, the rigidity may be a property based on Young's modulus. More specifically, in the case where the cross car beam 1 contains a fiber-reinforced resin, it is possible to use, as the above polymer material having a rigidity greater than that of the fiber-reinforced resin, a polymer material having a Young's modulus greater than that of the fiber-reinforced resin. For example, in the case where the cross car beam 1 contains a fiber-reinforced resin and an unsaturated polyester resin, examples of the polymer material having a rigidity greater than that of the fiber-reinforced resin include an aromatic polyamide resin. In the case where the pedal rearward displacement preventing member 7 is formed of the polymer material, it can be produced by, e.g., injection molding.

(Reinforcing Member)

The pedal rearward displacement preventing structure 10 may comprise the reinforcing member 5 or may be devoid of the reinforcing member 5. Even if the pedal rearward displacement preventing structure 10 is devoid of the reinforcing member 5, the effect of improving the collision performance based on the "pedal rearward displacement preventing structure" according to the present invention can be obtained. By adding the reinforcing member 5 to the pedal rearward displacement preventing structure 10, it becomes possible to obtain the effect of improving the steering device vibration performance based on the "conversion of torsional stress to flexural stress by the reinforcing member", in addition to the effect of improving the collision performance based on the "pedal rearward displacement preventing structure" according to the present invention.

As depicted in FIGS. 1 to 5, the center stay 3 and the steering device support member 2 are provided on the cross car beam 1 in spaced-apart relation to each other. The reinforcing member 5 is a member covering a part of the rear surface 1b of the cross car beam 1 located between the center stay 3 and the steering device support member 2.

Regarding the steering device vibration performance improving effect based on the reinforcing member 5, the reinforcing member 5 has a function of changing a deformation mode during deformation of the cross car beam 1 due to a force input to the pedal rearward displacement preventing structure 10. Specifically, the reinforcing member 5 is a deformation mode conversion member for changing a mode of deformation of the cross car beam due to a force input to the pedal rearward displacement preventing structure 10, from a "torsional deformation mode" to a "flexural deformation mode, to thereby convert torsional stress input to the pedal rearward displacement preventing structure 10, to flexural stress. More specifically, by using the reinforcing member 5, the pedal rearward displacement preventing structure 10 becomes less likely to under torsional deformation even if a force is input thereto based on vibration or the like, and becomes more likely to undergo flexural deformation in its entirety (particularly, a part of the pedal rearward displacement preventing structure 10 reinforced by the reinforcing member 5 becomes more likely to undergo flexural deformation). This makes it possible to sufficiently prevent a vibration input to the pedal rearward displacement preventing structure 10, such as a traveling vibration during traveling and an engine vibration during engine running, from being transmitted to a passenger, to thereby improve the steering device vibration performance.

In the case where the pedal rearward displacement preventing structure 10 comprises the reinforcing member 5, and the pedal rearward displacement preventing member 7 is directly fastened to the steering device support member 2, the pedal rearward displacement preventing structure 10 and the reinforcing member 5 provides a closed structure in cooperation with the steering device support member 2 and the center stay 3, in plan view. More specifically, in plan view, a closed structure is formed by the pedal rearward displacement preventing member 7, the center stay 3 (particularly, the top surface support portion 302), the reinforcing member 5 and the steering device support member 2. This closed structure means that a contiguous closed loop is formed by only the above members. This makes it possible to achieve a further improvement in the collision performance and the steering device vibration performance. The term "plan view" in the description about the closed structure means a plan view when viewed in the roof-to-floor direction in the vehicle height direction.

The reinforcing member 5 may have a solid plate-like structure. However, from the viewpoint of a further reduction in weight and a further improvement in the collision performance and the steering device vibration performance, the reinforcing member 5 preferably has the following reinforcing member rib structure, as depicted in FIG. 5.

Specifically, the reinforcing member 5 comprises: a surface member 50; an outer edge rib 501 provided to extend from an outer edge of the surface member 50 in a direction perpendicular to the surface member 50; and an inner rib 502 provided on an inner side of the outer edge rib to extend from the surface member in a direction perpendicular to the surface member 50.

In this connection, the reinforcing member 5 needs not necessarily have the surface member 50. However, a further improvement in the collision performance and the steering device vibration performance, the reinforcing member 5 preferably has the surface member 50.

In the reinforcing member rib structure, a plan-view shape of each of a plurality of spaces defined by the ribs may be a polygonal shape such as a tetragonal shape, a pentagonal shape or a hexagonal shape. Thus, this rib structure includes a honeycomb structure in which the plan-view shape of each of the plurality of spaces is a hexagonal shape.

The inner rib 502 includes at least a perpendicular rib (502a), and may further include a width-directional rib (not depicted).

The perpendicular rib (502a) is a rib extending on the surface member 50 in a direction perpendicular to the axial direction of the cross car beam 1. By the perpendicular rib, resistance to flexural stress converted from torsional stress is imparted to the pedal rearward displacement preventing structure 10. Particularly, in the case where the pedal rearward displacement preventing structure 10 has the reinforcing member 5 on a planner portion formed in the rear surface of the cross car beam, the perpendicular rib can reduce a displacement to be caused by the flexural stress in the upward-rearward direction (the roof-floor direction (Hr-Hf direction)) and the longitudinal direction (the forward-rearward direction (F-R direction)). Thus, by providing the perpendicular rib, the steering device vibration performance is significantly improved. Further, for example, compared with the case where the reinforcing member 5 has a solid plate-like structure, significantly excellent steering device vibration performance can be obtained.

The width-directional rib (not depicted) is a rib extending on the surface member 50 along a direction parallel to the axial direction of the cross car beam 1. By the width-directional rib, the resistance to flexural stress converted from torsional stress is also imparted to the pedal rearward displacement preventing structure 10. Particularly, in the case where the pedal rearward displacement preventing structure 10 has the reinforcing member 5 on the planner portion formed in the rear surface of the cross car beam, the width-directional rib can reduce a displacement to be caused by the flexural stress in the longitudinal direction (the forward-rearward direction (F-R direction)). Thus, by providing the width-directional rib, the steering device vibration performance is further improved.

Each of the perpendicular and width-directional ribs may have even height, or the width-directional rib may have a height lower than that of the perpendicular rib.

Each of the rib heights h1 (FIG. 5) of the outer edge rib and the inner rib of the reinforcing member 5 is typically set to 0.1×D or more, preferably the range of 0.1×D to 1×D, more preferably the range of 0.2×D to 0.5×D, individually, where D denotes the width (mm) of the rear surface 1b of the cross car beam 1.

In the reinforcing member 5, the thickness of each of the surface member, the outer edge rib and the inner rib is not particularly limited, but may be appropriately determined depending on the intended use of the pedal rearward displacement preventing structure 10. In the case where the pedal rearward displacement preventing structure is used in a vehicle, particularly in an automobile, each of the thicknesses of the surface member, the outer edge rib and the inner rib of the reinforcing member 5 is set to, e.g., the range of 0.5 to 10 mm, preferably the range of 0.5 to 3 mm, individually.

In the case where the reinforcing member 5 has the reinforcing member rib structure, the reinforcing member 5 is typically disposed such that the surface member 50 (particularly, a reverse surface thereof) comes into surface contact with the planar portion of the cross car beam 1.

The reinforcing member 5 is typically fastened to at least the steering device support member 2 and the center stay 3. Preferably, from the viewpoint of a further improvement in the collision performance and the steering device vibration performance, the reinforcing member 5 is fastened to the cross car beam 1, the steering device support member 2 and the center stay 3. By fastening the reinforcing member 5 to the steering device support member 2 and the center stay 3, it becomes possible to achieve coupling between the steering device support member 2 and the center stay 3. The coupling between the center stay 3 and the steering device support member 2 by the reinforcing member make it possible to achieve sufficient conversion of torsional stress to flexural stress. Thus, the pedal rearward displacement preventing structure 10 becomes much less likely to undergo torsional deformation, and the steering device vibration performance is further sufficiently improved. In this specification, the term "coupling" is used as a concept of connecting and interlocking two or more members.

The reinforcing member 5 may have a support portion extending from the top surface to the bottom surface via the rear surface of the cross car beam 1 so as to form an angular C-shaped surrounding portion. The reinforcing member 5 is formed with a support portion 57 extending toward the top surface and the bottom surface of the cross car beam 1 so as to form an angular C-shaped surrounding portion on the side of a reverse surface of the reinforcing member 5. That is, the reinforcing member 5 has an angular C-shaped cross-sectional shape. This cross-sectional shape means a shape of a cross-section taken along a plane perpendicular to the axial direction of the cross car beam 1. The angular C-shaped surrounding portion is typically configured such that an inner surface thereof comes into surface contact with the cross car beam 1. This makes it possible to further sufficiently prevent torsional deformation of the pedal rearward displacement preventing structure to further sufficiently improve the steering device vibration performance.

The reinforcing member 5 may be formed with a plurality of fastening holes, wherein the reinforcing member 5 and other member may be fastened together via the plurality of fastening holes.

From the viewpoint of a further improvement in the steering device vibration performance, as depicted in FIG. 5, the reinforcing member 5 may have a fastening peripheral piece formed on the support portion 57, wherein the fastening peripheral piece may be formed with a fastening hole.

As depicted in FIG. 5, the reinforcing member 5 may have a fastening peripheral piece 51a formed on the side of the center stay 3 to extend along the surface of the center stay 3, wherein the fastening peripheral piece 51a may be formed with a fastening hole.

As with the fastening peripheral piece 51a on the side of the center stay 3, the reinforcing member 5 may also have a fastening peripheral piece (not depicted) formed on the side of the steering device support member 2 to extend along the surface of the steering device support member 2, wherein this fastening peripheral piece may be formed with a fastening hole.

In the reinforcing member 5, the surface member 50 may be formed with a fastening holes, as depicted in FIG. 5, and fastened to other member by using the fastening hole.

In the reinforcing member 5, the plurality of fastening holes are formed at appropriate positions so as to achieve fastening between the reinforcing member 5 and other member. The number of fastening points between the reinforcing member 5 and other member is one or more. Preferably, the number may be increased to two or more, depending on the size of the reinforcing member 5.

[Pedal Rearward Displacement Preventing Mechanism]

A pedal rearward displacement preventing mechanism of the pedal rearward displacement preventing structure 10 according to the present invention is as follows.

For example, as depicted in FIG. 2, a brake pedal structure 8 is disposed in front of the pedal rearward displacement preventing structure 10, and a dash panel (not depicted) is disposed in front of the brake pedal structure 8. In the brake pedal structure 8, a pedal bracket 81 is attached to the dash panel (not depicted), and a brake pedal 82 is hangingly supported on the pedal bracket 81 such that it can be swung in the vehicle longitudinal direction about a first pivot shaft 83. The brake pedal 82 is coupled to a brake booster (not depicted) via a push rod. When a pedal depression portion 85 at a lower end of the brake pedal 82 is depressed forwardly by the foot of a driver, the push rod 84 is pushed forwardly so as to brake the vehicle. A swingable lever 86 is supported on the pedal bracket 81 such that it can be swung about a second pivot shaft 87 disposed rearward of the first pivot shaft 83.

When the pedal bracket 81 supporting the brake pedal 82 receives a load such that the amount of rearward displacement on a lower side of the pedal bracket 81 becomes greater than that on an upper side of the pedal bracket 81, i.e., an upward displacement of the swingable lever 86 exceeds a rearward displacement thereof, an upward displacement of a contact portion 86a of the swingable lever 86 is restricted by the stopper piece 7b provided in the pedal rearward displacement preventing member 7. Thus, due to restriction in the upward displacement of the swingable lever 86, the displacement of the pedal bracket 81 supporting the swingable lever 86 is also restricted, so that a rearward displacement of the brake pedal 82 is prevented.

INDUSTRIAL APPLICABILITY

The pedal rearward displacement preventing structure 10 of the present invention is a structure for preventing a rearward displacement of a brake pedal of a vehicle. In this specification, the term "vehicle" includes not only vehicles such as automobiles, buses, trucks and electric trains (railroad vehicles), but also any other vehicle (transporter) equipped with a steering device. For example, the term "vehicle" includes airplanes and marine vessels.

The invention claimed is:

1. A pedal rearward displacement preventing structure for a vehicle, comprising:
    a cross car beam having a given axial direction and extending along the axial direction;
    a pedal rearward displacement preventing member attached to the cross car beam to prevent a rearward displacement of a brake pedal; and
    a center stay for supporting the cross car beam,
    wherein the pedal rearward displacement preventing member is disposed on a forward side of the center stay in a forward-rearward direction of the vehicle,
    wherein the cross car beam has a rectangular shape in cross-sectional view, the rectangular shape having a top surface, a bottom surface, a front surface and a rear surface,
    wherein the center stay comprises a rear surface support portion extending to cover the rear surface of the cross car beam, and at least one of a top surface support portion extending from the rear surface support portion to cover the top surface of the cross car beam and a bottom surface support portion extending from the rear surface support portion to cover the bottom surface of the cross car beam,
    wherein the pedal rearward displacement preventing member has a rear end which is formed to cover the front surface of the cross car beam, and a front edge face of the at least one of the top surface support portion and the bottom surface support portion of the center stay, and
wherein the rear end of the pedal rearward displacement preventing member is formed to cover the front surface of the cross car beam, the front edge face of the top surface support portion, and the front edge face of the bottom surface support portion.

2. The pedal rearward displacement preventing structure according to claim 1,
wherein the center stay further comprises an angular C-shaped fixing section composed of a rear surface-side surface member provided between the rear surface support portion and the rear surface of the cross car beam, a top surface-side surface member provided between the top surface support portion and the top surface of the cross car beam, and a bottom surface-side surface member provided between the bottom surface support portion and the bottom surface of the cross car beam, and
the pedal rearward displacement preventing member has a top surface-side extension piece extending parallel to the top surface of the cross car beam, and a bottom surface-side extension piece extending parallel to the bottom surface of the cross car beam,
and wherein the center stay, the pedal rearward displacement preventing member and the cross car beam are fastened together by three-component co-fastening for the angular C-shaped fixing section of the center stay, the top surface-side extension piece and the bottom surface-side extension piece of pedal rearward displacement preventing member, and the cross car beam.

3. The pedal rearward displacement preventing structure according to claim 1,
wherein each of the top surface support portion and the bottom surface support portion extends up to a position of the front surface of the cross car beam, in the forward-rearward direction of the vehicle.

4. The pedal rearward displacement preventing structure according to claim 1,
wherein the pedal rearward displacement preventing member has:
a front end wall formed at a front end of the pedal rearward displacement preventing member and configured to receive an input of a rearward load transmitted from the brake pedal;
a rear end wall formed at a rear end of the pedal rearward displacement preventing member; and
a rib structure comprising a rib formed to extend from the rear end wall toward the front end wall.

5. The pedal rearward displacement preventing structure according to claim 4,
wherein the rib of the pedal rearward displacement preventing member extends from the rear end wall in a direction perpendicular to the front surface of the cross car beam.

6. The pedal rearward displacement preventing structure according to claim 4,
wherein the rib of the pedal rearward displacement preventing member extends from the rear end wall in a direction perpendicular to the front surface of the cross car beam and parallel to the top surface of the cross car beam.

7. A pedal rearward displacement preventing structure for a vehicle, comprising:
a cross car beam having a given axial direction and extending along the axial direction;
a pedal rearward displacement preventing member attached to the cross car beam to prevent a rearward displacement of a brake pedal; and
a center stay for supporting the cross car beam,
wherein the pedal rearward displacement preventing member is disposed on a forward side of the center stay in a forward-rearward direction of the vehicle,
the pedal rearward displacement preventing structure further comprising a steering device support member attached to the cross car beam to support a steering device.

8. The pedal rearward displacement preventing structure according to claim 7,
wherein the pedal rearward displacement preventing member is fastened to the steering device support member.

9. The pedal rearward displacement preventing structure according to claim 7,
wherein the steering device support member and the center stay are provided on the cross car beam in spaced-apart relation to each other, and
wherein the pedal rearward displacement preventing structure further comprises a reinforcing member provided to cover a part of the cross car beam located between the steering device support member and the center stay.

10. The pedal rearward displacement preventing structure according to claim 9,
wherein the reinforcing member is fastened to both of the steering device support member and the center stay.

11. The pedal rearward displacement preventing structure according to claim 1,
wherein the cross car beam is a hollow body formed of a fiber-reinforced resin, and
wherein the pedal rearward displacement preventing member is formed of a polymer material having a rigidity greater than that of the fiber-reinforced resin.

12. The pedal rearward displacement preventing structure according to claim 1,
wherein the cross car beam is a draw-formed body.

13. The pedal rearward displacement preventing structure according to claim 1,
wherein the vehicle is an automobile, and
wherein the given axial direction of the cross car beam is a direction extending in a direction identical to a width direction of the automobile.

14. The pedal rearward displacement preventing structure according to claim 7,
wherein the pedal rearward displacement preventing member has:
a front end wall formed at a front end of the pedal rearward displacement preventing member and configured to receive an input of a rearward load transmitted from the brake pedal;
a rear end wall formed at a rear end of the pedal rearward displacement preventing member; and
a rib structure comprising a rib formed to extend from the rear end wall toward the front end wall.

15. The pedal rearward displacement preventing structure according to claim 14,
wherein the rib of the pedal rearward displacement preventing member extends from the rear end wall in a direction perpendicular to the front surface of the cross car beam.

16. The pedal rearward displacement preventing structure according to claim 14, wherein the rib of the pedal rearward displacement preventing member extends from the rear end wall in a direction perpendicular to the front surface of the cross car beam and parallel to the top surface of the cross car beam.

17. The pedal rearward displacement preventing structure according to claim 7,
wherein the cross car beam is a hollow body formed of a fiber-reinforced resin, and
wherein the pedal rearward displacement preventing member is formed of a polymer material having a rigidity greater than that of the fiber-reinforced resin.

18. The pedal rearward displacement preventing structure according to claim 7,
wherein the cross car beam is a draw-formed body.

19. The pedal rearward displacement preventing structure according to claim 7,
wherein the vehicle is an automobile, and
wherein the given axial direction of the cross car beam is a direction extending in a direction identical to a width direction of the automobile.

\* \* \* \* \*